United States Patent
Peterson et al.

(10) Patent No.: US 12,220,686 B2
(45) Date of Patent: *Feb. 11, 2025

(54) PROCESS FOR PRODUCING SUPERABSORBENTS

(71) Applicant: BASF SE, Ludwigshafen (DE)

(72) Inventors: Monte Alan Peterson, Freeport, TX (US); Ronny De Kaey, Antwerp (BE); Karl Possemiers, Antwerp (BE); Juergen Schroeder, Ludwigshafen (DE); Ruediger Funk, Ludwigshafen (DE); Matthias Weismantel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 852 days.

This patent is subject to a terminal disclaimer.

(21) Appl. No.: 17/289,287

(22) PCT Filed: Nov. 4, 2019

(86) PCT No.: PCT/EP2019/080015
§ 371 (c)(1),
(2) Date: Apr. 28, 2021

(87) PCT Pub. No.: WO2020/099155
PCT Pub. Date: May 22, 2020

(65) Prior Publication Data
US 2021/0402370 A1    Dec. 30, 2021

(30) Foreign Application Priority Data

Nov. 14, 2018 (EP) ..................... 18206128

(51) Int. Cl.
*C08F 120/06* (2006.01)
*B01J 19/00* (2006.01)
(Continued)

(52) U.S. Cl.
CPC ......... *B01J 20/267* (2013.01); *B01J 19/0053* (2013.01); *B01J 19/2465* (2013.01);
(Continued)

(58) Field of Classification Search
None
See application file for complete search history.

(56) References Cited

U.S. PATENT DOCUMENTS 4,750,556 A * 6/1988 del Valle P. ............. C08F 14/06
165/169
8,575,389 B2 * 11/2013 Weismantel .......... C07C 51/412
562/512

(Continued)

FOREIGN PATENT DOCUMENTS

CN    2643992 Y    9/2004
CN    202113862 U    1/2012
(Continued)

OTHER PUBLICATIONS

Graham, et al., "Chapter 3: Commercial Processes for the Manufacture of Superabsorbent Polymers", Modern Superabsorbent Polymer Technology, ed. Buchholz, et al., 2nd Edition, 1998, pp. 69-117.
(Continued)

*Primary Examiner* — Mark S Kaucher
(74) *Attorney, Agent, or Firm* — Element IP, PLC

(57) ABSTRACT

The invention relates to a process for producing superabsorbent polymer particles, comprising polymerization of a monomer solution, wherein the monomer solution comprises partly neutralized acrylic acid formed by continuous mixing of acrylic acid and an aqueous solution of a base, the apparatus for preparing the partly neutralized acrylic acid comprises a vessel (B), and the feed line to vessel (B) ends inside vessel (B) below the liquid Level of the partly neutralized acrylic acid.

14 Claims, 2 Drawing Sheets

Figure 1:
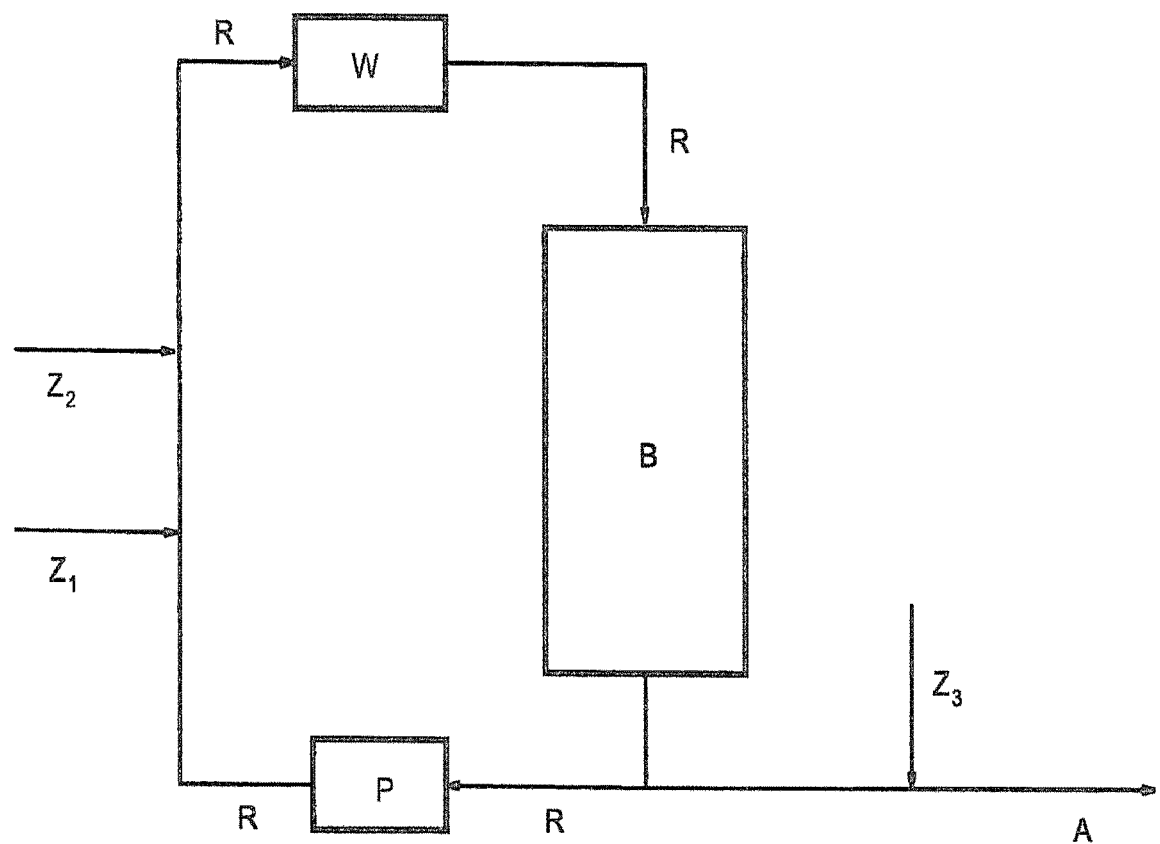

(51) Int. Cl.
  *B01J 19/24* (2006.01)
  *B01J 20/26* (2006.01)
  *B01J 20/28* (2006.01)
  *B01J 20/30* (2006.01)
(52) U.S. Cl.
  CPC ..... *B01J 20/28047* (2013.01); *B01J 20/3021* (2013.01); *B01J 20/3085* (2013.01); *C08F 120/06* (2013.01); B01J 2219/00166 (2013.01); B01J 2219/1943 (2013.01); B01J 2219/1945 (2013.01); C08F 2810/20 (2013.01)

(56) References Cited

U.S. PATENT DOCUMENTS

| | | |
|---|---|---|
| 2008/0194863 A1 | 8/2008 | Weismantel et al. |
| 2008/0242816 A1 | 10/2008 | Weismantel et al. |
| 2011/0021725 A1 | 1/2011 | Takaai et al. |
| 2012/0189861 A1 | 7/2012 | Matsumoto et al. |
| 2021/0402373 A1 | 12/2021 | Peterson et al. |

FOREIGN PATENT DOCUMENTS

| | | |
|---|---|---|
| CN | 103582654 A | 2/2014 |
| CN | 103623763 A | 3/2014 |
| CN | 203513771 U | 4/2014 |
| CN | 204320315 U | 5/2015 |
| CN | 204724041 U | 10/2015 |
| CN | 205055881 U | 3/2016 |
| CN | 105879815 A | 8/2016 |
| CN | 205761197 U | 12/2016 |
| CN | 108126645 A | 6/2018 |
| DE | 102005042604 A1 | 3/2007 |
| JP | H02-209906 A | 8/1990 |
| JP | 2004339170 A | 12/2004 |
| JP | 2009-507061 A | 2/2009 |
| JP | 2022-507366 A | 1/2022 |
| WO | WO-2004/069293 A1 | 8/2004 |
| WO | WO-2015/177014 A1 | 11/2015 |

OTHER PUBLICATIONS

Lv, et al., "Chemical Reaction Training" Beijing Institute of Technology Press, Mar. 2013, pp. 9-12.

International Application No. PCT/EP2019/080015, International Search Report and Written Opinion, mailed Jan. 15, 2020.

\* cited by examiner

PROCESS FOR PRODUCING SUPERABSORBENTS

CROSS-REFERENCE TO RELATED APPLICATIONS

This is the U.S. national phase of International Application No. PCT/EP2019/080015, filed Nov. 4, 2019, which claims the benefit of European Patent Application No. 18206128.3, filed on Nov. 14, 2018.

DESCRIPTION

The invention relates to a process for producing superabsorbent polymer particles, comprising polymerization of a monomer solution, wherein the monomer solution comprises partly neutralized acrylic acid formed by continuous mixing of acrylic acid and an aqueous solution of a base, the apparatus for preparing the partly neutralized acrylic acid comprises a vessel (B), and the feed line to vessel (B) ends inside vessel (B) below the liquid level of the partly neutralized acrylic acid.

Superabsorbent polymer particles are used to produce diapers, tampons, sanitary napkins and other hygiene articles, but also as water-retaining agents in market gardening. The superabsorbent polymer particles are often also referred to as "absorbent resins", "superabsorbents", "superabsorbent polymers", "absorbent polymers", "absorbent gelling materials", "hydrophilic polymers" or "hydrogels".

The production of superabsorbent polymer particles is described in the monograph "Modern Superabsorbent Polymer Technology", F. L. Buchholz and A. T. Graham, Wiley-VCH, 1998, pages 71 to 103.

The properties of superabsorbent polymer particles can be adjusted, for example, via the amount of crosslinker used. With increasing amount of crosslinker the centrifuge retention capacity (CRC) falls and the absorption under a pressure of 21.0 g/cm$^2$ (AUL0.3 psi) passes through a maximum.

To improve the application properties, for example permeability of the swollen gel bed (SFC) in the diaper and absorption under a pressure of 49.2 g/cm$^2$ (AUL0.7 psi), superabsorbent polymer particles are generally surface post-crosslinked. This increases the degree of crosslinking of the particle surface, which allows the absorption under a pressure of 49.2 g/cm$^2$ (AUL0.7 psi) and the centrifuge retention capacity (CRC) to be at least partly de-cou-pled. This surface post-crosslinking can be performed in the aqueous gel phase. Preferably, however, dried, ground and screened-off polymer particles (base polymer) are surface coated with a surface post-crosslinker, thermally surface pos-tcross-linked and dried. Crosslinkers suitable for this purpose are compounds which can form covalent bonds with at least two carboxylate groups of the superabsorbing polymer particles.

US 2008/0194863, US 2011/0021725, and US 2012/0189861, discloses processes for preparation of superabsorbent polymers including neutralization of acrylic acid.

It was an object of the present invention to provide an improved process for producing superabsorbent polymer particles, especially a process having an improved neutralization step.

The object was achieved by a process for producing superabsorbent polymer particles, comprising polymerization of a monomer solution, comprising
a) partly neutralized acrylic acid,
b) at least one crosslinker and
c) at least one initiator, drying the resulting polymer gel, optionally grinding and classifying the resulting dried polymer gel and optionally thermally post-crosslinking and cooling the resulting polymer particles, wherein the partly neutralized acrylic acid is formed by continuous mixing of acrylic acid, an aqueous solution of a base, and optionally water, the apparatus for preparing the partly neutralized acrylic acid comprises a ring line (R), a vessel (B), a heat exchanger (W), and a pump (P), and the feed line to vessel (B) ends inside vessel (B) below the liquid level of the partly neutralized acrylic acid.

The feed line to vessel (B) ends preferably less than 1.5 m, more preferably less than 1 m, most preferably less than 0.5 m, above the bottom of the vessel (B).

A lower end of the feed line in vessel (B) improves the discharge of undesired polymeric products.

The outlet of vessel (B) is in the center of the bottom of vessel (B) and the horizontal distance of the center of the feed line to vessel (B) from the center of the bottom of vessel (B) is preferably from 0.50 to 1.50 m, more preferably from 0.70 to 1.30 m, most preferably from 0.90 to 1.00 m.

The feed line to vessel (B) has a cylindrical shape and a diameter of preferably from 0.1 to 0.5 m, more preferably from 0.15 to 0.4 m, most preferably from 0.2 to 0.3 m.

The inner volume of the vessel (B) is preferably from 10 to 50 m, more preferably from 15 to 45 m, most preferably from 20 to 30 m.

The filling level of the vessel (B) is preferably from 10 to 80%, more preferably from 20 to 70%, most preferably from 30 to 60%, wherein the filling level is the quotient of the volume of partly neutralized acrylic acid in vessel (B) and the inner volume of the vessel (B).

The residence time of the partly neutralized acrylic acid in vessel (B) is preferably from 10 to 80 minutes, more preferably from 15 to 60 minutes, most preferably from 20 to 40 minutes, wherein the residence time is the quotient of the volume of partly neutralized acrylic acid in vessel (B) and the feed per minute to the apparatus for preparing the partly neutralized acrylic acid.

In a preferred embodiment of the present invention, the vessel (B) has a cylindrical shape having a diameter d and a torispherical bottom, and the torispherical bottom has a dish having a radius $r_1$ of 0.8 to 1.2 d, preferably from 0.85 to 1.15 d, more preferably from 0.9 to 1.1 d, most preferably from 0.95 to 1.05 d, and a toroidal shaped knuckle having a radius $r_2$ of 0.06 to 0.17 d, preferably from 0.07 to 0.15 d, more preferably from 0.08 to 0.13 d, most preferably from 0.09 to 0,11 d.

Figure 2:
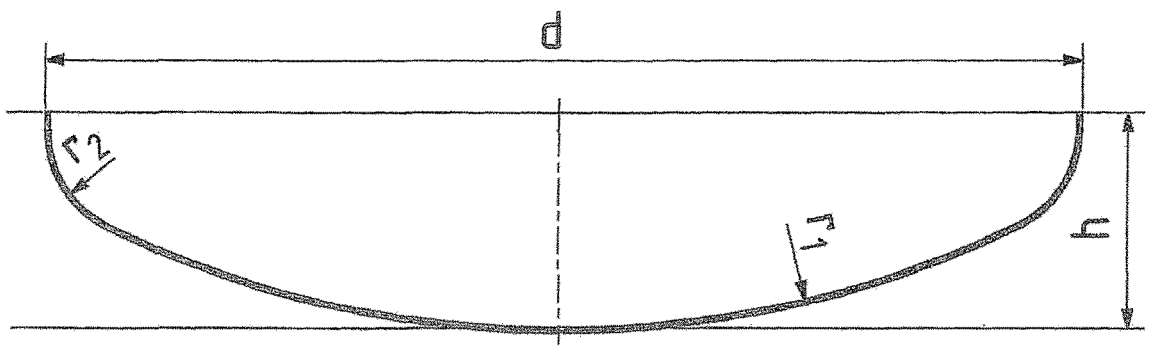

FIG. 1 shows an exemplary neutralization apparatus. The reference symbols have the following definitions:
$Z_1$ to $Z_3$ feeds for reactants
A outlet
B vessel
P pump
R ring line
W heat exchanger FIG. 2 shows an exemplary torispherical bottom. The reference symbols have the following definitions:
d diameter of the cylindrical part of the vessel
$r_1$ radius of the dish
$r_2$ radius of the toroidal shaped knuckle
h height of the bottom The diameter d of the cylindrical part of the vessel (B) is preferably from 1 to 5 m, more preferably from 1.5 to 4.5 m, most preferably from 2 to 4 m.

The base for neutralization is preferably sodium hydroxide, sodium hydrogen carbonate, sodium carbonate, potassium hydroxide, potassium hydrogen carbonate and/or potassium carbonate, more preferably sodium hydroxide, sodium hydrogen carbonate and/or sodium carbonate, most preferably sodium hydroxide.

The degree of neutralization of the partly neutralized acrylic acid is preferably from 40 to 85 mol-%, more preferably from 50 to 80 mol-%, most preferably from 60 to 75 mol-%.

The solids content of the partly neutralized acrylic acid is preferably from 20 to 60% by weight, more preferably from 30 to 55% by weight, most preferably from 40 to 50% by weight.

The temperature of the partly neutralized acrylic acid is preferably from 20 to 70° C., more preferably from 25 to 60° C., most preferably from 30 to 50° C.

The partly neutralized acrylic acid is recycled via the ring line (R). The amount of recycled partly neutralized acrylic acid is preferably from 75 to 98%, more preferably from 80 to 95%, most preferably from 85 to 90%, based on the amount of partly neutralized acrylic acid dis-charged from vessel (B).

The present invention is based on the finding that a lower end of the feed line in vessel (B) reduces the amount of undesired deposition of polymeric products on the bottom of vessel (B). Formed polymeric product leaves vessel (B) via the ring line (R) and can easily be removed by a filter in the ring line (R).

A filter may be between vessel (B) and pump (P). The pore size of the filter is in the range of preferably 50 to 1,000 μm, more preferably 100 to 700 μm, most preferably 150 to 400 μm.

Deposition of polymeric products can further be reduced by keeping dead spaces in the sys-tem at a minimum. For that purpose the pump (P) in the ring line (R) can operate at a minimum value for keeping the partly neutralized acrylic acid in vessel (B) in motion and by using a nozzle at the end of the ring line (R) in vessel (B). Dead spaces in that nozzle can be reduced by installing of suitable displacers.

The production of the superabsorbents is described in detail hereinafter:

The superabsorbents are produced by polymerizing a monomer solution and are typically water-insoluble.

Acrylic acid typically comprises polymerization inhibitors, preferably hydroquinone monoethers, as storage stabilizers.

The monomer solution comprises preferably up to 250 ppm by weight, preferably at most 150 ppm by weight, more preferably at most 100 ppm by weight, and preferably at least 10 ppm by weight, more preferably at least 30 ppm by weight and especially around 50 ppm by weight, of hydroquinone monoether, based in each case on acrylic acid prior to neutralization. For example, the monomer solution can be prepared by using acrylic acid with an appropriate content of hydroquinone monoether.

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of acrylic acid. In addition, polyvalent metal salts which can form coordinate bonds with at least two acid groups of acrylic acid are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tet- raallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

The amount of crosslinker b) is preferably 0.05 to 1.5% by weight, more preferably 0.1 to 1% by weight and most preferably 0.3 to 0.6% by weight, based in each case on acrylic acid prior to neutralization. With rising crosslinker content, the centrifuge retention capacity (CRC) falls and the absorption under a pressure of $21.0$ $g/cm^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. However, the reducing component used is preferably disodium 2-hydroxy-2-sulfonatoacetate or a mixture of disodium 2-hydroxy-2-sulfinatoacetate, disodium 2-hydroxy-2-sulfonatoacetate and sodium bisulfite. Such mixtures are obtainable as Brüggolite® FF6 and Brüggolite® FF7 (Brüggemann Chemicals; Heilbronn; Germany).

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

For better control of the polymerization reaction, it is optionally possible to add all known chelating agents to the monomer solution or suspension or to the raw materials thereof. Suitable chelating agents are, for example, phosphoric acid, diphosphoric acid, triphosphoric acid, polyphosphoric acid, citric acid, tartaric acid, or salts thereof.

The monomer solution is polymerized. Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

The acid groups of the resulting polymer gels have typically been partially neutralized. Neutralization is carried out at the monomer stage. This is typically accomplished by mixing in the neutralizing agent as an aqueous solution or preferably also as a solid. The degree of neutralization is preferably from 50 to 85 mol %, more preferably from 60 to 80 mol % and most preferably from 65 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, potassium hydroxide and also mixtures thereof.

The resulting polymer gel is dried. The driers are not subject to any restriction. However, the drying of the polymer gel is preferably performed with a belt drier until the residual moisture content is preferably 0.5 to 10% by weight, more preferably 1 to 7% by weight and most preferably 2 to 5% by weight, the residual moisture content being determined by EDANA recommended test method No. WSP 230.2 (05) "Mass Loss Upon Heating". In the case of too high a residual moisture content, the dried polymer gel has too low a glass transition temperature $T_9$ and can be processed further only with difficulty. In the case of too low a residual moisture content, the dried polymer gel is too brittle and, in the subsequent grinding steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Subsequently, the dried polymer gel is ground and classified. The apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm and very particularly from 300 to 500 µm. The mean particle size of the product fraction may be determined by means of EDANA recommended test method No. WSP 220.2 (05) "Particle Size Distribution", where the proportions by mass of the screen fractions are plotted in cumulated form and the mean particle size is determined graphically. The mean particle size here is the value of the mesh size which gives rise to a cumulative 50% by weight.

To improve the properties, the polymer particles may subsequently be thermally surface post-crosslinked. Suitable surface post-crosslinkers are compounds which comprise groups which can form covalent bonds with at least two acid groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or #-hydroxyalkylamides, as described in DE 102 04 938 A1 and U.S. Pat. No. 6,239,230.

The amount of surface post-crosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface post-crosslinkers before, during or after the surface post-crosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, hydroxide, sulfate, hydrogensulfate, carbonate, hydrogencarbonate, nitrate, phosphate, hydrogenphosphate, dihydrogenphosphate and carboxylate, such as acetate and lactate. Aluminum hydroxide, aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface post-crosslinking is typically performed in such a way that a solution of the surface post-crosslinker is sprayed onto the dried polymer particles. After the spray application, the polymer particles coated with surface post-crosslinker are dried thermally, and the surface post-crosslinking reaction can take place either before or during the drying.

The spray application of a solution of the surface post-crosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface post-crosslinker solution in a fluidized bed.

The surface post-crosslinkers are typically used in the form of an aqueous solution. The penetration depth of the surface post-crosslinker into the polymer particles can be adjusted via the content of non-aqueous solvent and total amount of solvent.

The thermal surface post-crosslinking is preferably performed in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed driers may also be used.

The thermal surface post-crosslinking can be effected in the mixer itself, by heating the jacket or blowing in warm air. Equally suitable is a downstream drier, for example a shelf drier, a rotary tube oven or a heatable screw. It is particularly advantageous to effect mixing and drying in a fluidized bed drier.

Preferred surface post-crosslinking temperatures are in the range of 100 to 250° C., preferably 110 to 230° C., more preferably 120 to 210° C. and most preferably 130 to 190° C. The preferred residence time at this temperature in the reaction mixer or drier is preferably at least 10 minutes, more preferably at least 20 minutes, most preferably at least 30 minutes, and typically at most 60 minutes.

Subsequently, the surface post-crosslinked polymer particles can be classified again, excessively small and/or excessively large polymer particles being removed and recycled into the process.

To further improve the properties, the surface post-crosslinked polymer particles can be coated or remoisturized.

The remoisturizing is preferably performed at 30 to 80° C., more preferably at 35 to 70° C., most preferably at 40 to 60° C. At excessively low temperatures, the superabsorbents tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging.

Suitable coatings for improving the free swell rate and the saline flow conductivity (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosile®, or precipitated silica, such as Sipernat® D17, and surfactants, such as Span® 20.

The present invention further provides hygiene articles, comprising superabsorbent polymer particles prepared according to the inventive process.

EXAMPLES

Example 1 (Inventive)

An apparatus as described in FIG. 1 was used for preparing the partly neutralized acrylic acid. The diameter of the ring line R was 25 cm, the diameters of the feed lines $Z_1$ to $Z_3$ was 5 cm each, the inner volume of vessel B was 25 m, the diameter d of vessel B was 3 m, and the height of the cylindrical part of vessel B was 3 m.

The feed line to vessel B ends 0.1 m above the bottom of vessel B and the horizontal distance of the center of the feed line to vessel B from the center of the bottom of vessel B is 1 m.

The bottom of vessel B had a torispherical shape as described in FIG. 2. The outlet of vessel B is in the center of the bottom. The dish had a radius $r_1$ of 3 m, the knuckle had a radius $r_2$ of 0.3 m, and the bottom had a height h of 0.75 m.

5.14 t/h of 48% by weight sodium hydroxide solution and 7.48 t/h water were premixed and cooled to 37° C. and added via feed line $Z_1$. 6.84 t/h of acrylic acid were added via feed line $Z_2$. 450 t/h of partly neutralized acrylic acid were recycled via the ring line R. Additional 0.57 t/h of 48% by weight sodium hydroxide solution and 0.83 t/h water were premixed and added via feed line $Z_3$.

A filter having a mesh size of 270 μm was installed in the ring line R between the vessel B and the pump P.

The filling level of vessel B was in the range from 30 to 70%. That corresponds to a residence time in the range from 23 to 54 minutes.

After several month of operation, there was no fouling (precipitated polymeric acrylic acid) at the bottom of vessel B.

The monomer solution was further cooled. Next, 3-tuply ethoxylated glycerol triacrylate was added as crosslinker to the monomer solution. The amount of crosslinker was 1.43 kg per t of monomer solution.

The free-radical polymerization was initiated by adding 1.31 kg of a 0.25% by weight aqueous hydrogen peroxide solution, 3.00 kg of a 30% by weight aqueous sodium peroxodisulfate solution, and 0.98 kg of a 1% by weight aqueous ascorbic acid solution, each based per t of monomer solution. The peroxides were added to the monomer solution. The monomer solution had a temperature of 26° C. at the feed.

The components (monomer solution and aqueous ascorbic acid solution) were metered continuously into a continuous kneader reactor with a capacity of 6.3 $m^3$ (LIST AG, Arisdorf, Switzerland).

Between the addition point for the crosslinker and the addition points of the peroxides, the monomer solution was inertized with nitrogen.

After approx. 50% of the residence time in the polymerization reactor, a metered addition of fines (1270 kg/h), which were obtained from the production process by grinding and screening, to the reactor additionally took place. The residence time of the reaction mixture in the reactor was 15 minutes.

The resulting polymer gel was placed onto a belt dryer. On the belt dryer, an air/gas mixture flowed continuously around the polymer gel and dried it.

The dried polymer gel was ground and screened off to a particle size fraction of 150 to 850 μm.

Example 2 (Inventive)

Example 1 was repeated, except that vessel B had a flat bottom ($r_1=0\infty$).

After several months of operation, there was no fouling (precipitated polymeric acrylic acid) at the bottom of vessel B.

Example 3 (Comparative)

Example 1 was repeated, except that the feed line to vessel B ended at the head of vessel B and that vessel B had a flat bottom ($r_1=\infty$).

After several months of operation, there was fouling (precipitated polymeric acrylic acid) at the bottom of vessel B.

The invention claimed is:
1. A process for producing superabsorbent polymer particles, comprising polymerizing of a monomer solution, comprising
   a) partly neutralized acrylic acid,
   b) at least one crosslinker, and
   c) at least one initiator,
   drying a resulting polymer gel, optionally grinding and classifying a resulting dried polymer gel and optionally thermally post-crosslinking and cooling resulting polymer particles, wherein the partly neutralized acrylic acid is formed by continuous mixing of acrylic acid, an aqueous solution of a base, and optionally water, an apparatus for preparing the partly neutralized acrylic acid comprises a ring line (R), a vessel (B), a heat exchanger (W), and a pump (P), and a feed line to vessel (B) ends inside vessel (B) below a liquid level of the partly neutralized acrylic acid.

2. The process according to claim 1, wherein the feed line to vessel (B) ends from 0.05 to 0.5 m above the bottom of the vessel (B).

3. The process according to claim 1, wherein an outlet of vessel (B) is in a center of the bottom of vessel (B) and a horizontal distance of a center of the feed line to vessel (B) from the center of the bottom of vessel (B) is from 0.50 to 1.50 m.

4. The process according to claim 1, wherein the feed line to vessel (B) has a cylindrical shape and a diameter from 0.1 to 0.5 m.

5. The process according to claim 1, wherein an inner volume of the vessel (B) is from 10 to 50 $m^3$.

6. The process according to claim 1, wherein a filling level of the vessel (B) is from 10 to 80%, wherein the filling level is a quotient of a volume of partly neutralized acrylic acid in vessel (B) and an inner volume of the vessel (B).

7. The process according to claim 1, wherein
a residence time of the partly neutralized acrylic acid in vessel (B) is from 20 to 80 minutes, wherein the residence time is a quotient of a volume of partly neutralized acrylic acid in vessel (B) and a feed per minute to the apparatus for preparing the partly neutralized acrylic acid.

8. The process according to claim 1, wherein the vessel (B) has a cylindrical shape having a diameter d and a torispherical bottom, and the torispherical bottom has a dish having a radius $r_1$ of 0.8 to 1.0 d and a toroidal shaped knuckle having a radius $r_2$ of 0.1 to 0.154 d.

9. The process according to claim 1, wherein the diameter d of the cylindrical part of the vessel (B) is from 1 to 5 m.

10. The process according to claim 1, wherein the base for neutralization is sodium hydroxide, sodium hydrogen carbonate, sodium carbonate, potassium hydroxide, potassium hydrogen carbonate, and/or potassium carbonate.

11. The process according to claim 1, wherein a degree of neutralization of the partly neutralized acrylic acid is from 40 to 85 mol-%.

12. The process according to claim 1, wherein a solids content of the partly neutralized acrylic acid is from 40 to 50% by weight.

13. The process according to claim 1, wherein
a temperature of the partly neutralized acrylic acid is from 20 to 70° C.

14. The process according to claim 1, wherein from 75 to 98% of the partly neutralized acrylic acid is recycled via the ring line (R).

* * * * *